US012756180B2

(12) United States Patent
Wang

(10) Patent No.: US 12,756,180 B2
(45) Date of Patent: Oct. 6, 2026

(54) METHODS AND DEVICES FOR MANAGING POWER SUPPLY SYSTEMS

(71) Applicant: Comcast Cable Communications, LLC, Philadelphia, PA (US)

(72) Inventor: Jon-En Wang, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 219 days.

(21) Appl. No.: 18/631,766

(22) Filed: Apr. 10, 2024

(65) Prior Publication Data

US 2025/0323496 A1 Oct. 16, 2025

(51) Int. Cl.
*H02H 9/02* (2006.01)
*H02H 1/00* (2006.01)
*H02H 9/04* (2006.01)
*H04H 20/84* (2008.01)

(52) U.S. Cl.
CPC .......... *H02H 9/025* (2013.01); *H02H 1/0092* (2013.01); *H02H 9/041* (2013.01); *H04H 20/84* (2013.01)

(58) Field of Classification Search
CPC .. H02H 9/02; H02H 1/00; H02H 9/04; H02H 9/025; H02H 1/0092; H02H 9/041; H02H 1/0007; H02H 3/00; H02H 3/08; H02H 3/20; H04H 20/84
USPC .................................................. 361/117–120
See application file for complete search history.

(56) References Cited

U.S. PATENT DOCUMENTS

| | | | | |
|---|---|---|---|---|
| 11,502,726 | B2 | 11/2022 | Le et al. | |
| 2005/0047048 | A1* | 3/2005 | Chin | H02H 9/047 361/118 |
| 2018/0217658 | A1* | 8/2018 | Bruhn, Jr. | G01R 19/16547 |
| 2018/0248351 | A1* | 8/2018 | Vail | H02H 5/005 |
| 2018/0309285 | A1* | 10/2018 | Jacobson | H02H 9/042 |
| 2024/0396326 | A1* | 11/2024 | Ariesen | H02H 9/02 |
| 2025/0062609 | A1* | 2/2025 | Grimm | H02H 3/202 |

* cited by examiner

*Primary Examiner* — Danny Nguyen
(74) *Attorney, Agent, or Firm* — BakerHostetler

(57) ABSTRACT

Systems and methods described herein relate to managing power systems. A power supply system may include a power control system. The power control system may monitor the power generated for carrying content to end destinations, such as a playback device. When a current surge is detected, the power control system may determine that a surge protector of the power supply system has activated. The power monitoring system may modify the generated power to reset the surge protector prior to a standard resetting event. For example, the power monitoring system may switch the polarity of the generated current at a quicker frequency than the normal frequency of the power supply. The quicker reset of the surge protector may limit any potential damage components of the power supply may experience due to the surge protector being in the active state.

19 Claims, 7 Drawing Sheets

METHODS AND DEVICES FOR MANAGING POWER SUPPLY SYSTEMS

BACKGROUND

Service providers may create, process and transmit content to users using power signals from power supplies. In some cases, power supplies may experience a current event, such as a surge event, where current levels spike, or become large enough to cause damage to equipment. Surge protectors may prevent this excessive current from causing this damage. However, surge protectors have shortcomings, related to timing of activation and reset of such devices, that are addressed by the disclosure.

SUMMARY

Systems and methods described herein relate to managing power systems. Certain types of surge protectors, such as those found in power supplies for service providers, may be more suited for particular types of power supplies. For example, alternating current (AC) power supplies are typically provided in a higher frequency (e.g., 60 Hz). Thus, these AC power supplies cross zero voltage more frequently (e.g. every 8.3 milliseconds), which may allow for activated surge protectors to reset more quickly. In power supplies provided in lower frequencies, such as with polarity-switched direct current (DC) power supplies, the resetting thresholds for activated surge protectors may be more spread out over time. Surge protectors in these lower frequency power systems may stay within an activated state for a longer period of time, which may cause damage to hardware of the power supply.

According to the present disclosure, a power supply system, such as a cable plant for providing content, may include a power control system or subsystem. The power control system may monitor the power being generated by the power supply system. The power control system may monitor for current surges, power surges, and the like, experienced by the power supply system. When a current surge is detected, the power control system may determine that a surge protector of the power supply system has activated. The power control system may attempt to reset the surge protector prior to a standard resetting event. For example, the power control system may switch the polarity of the generated current at a quicker frequency than the normal frequency of the power supply. The quicker reset of the surge protector may limit any potential damage components of the power supply system may experience due to the surge protector being in the active state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Systems and methods are described herein for managing power supply systems. Power supply systems may include surge protectors configured to protect hardware of the power supply system from damage caused by power surge events. However, these surge protectors may be configured for use under optimal power generating conditions. For example, a surge protector may be configured to be incorporated into a power supply system operating at a particular frequency or frequency range. There may be benefits, however, in modifying the operating parameters of the power supply system, such as to generate a power supply having different parameters. For example, content providers may include power supply systems and associated hardware configured for generating AC power.

In cases where the power supply system is reconfigured for outputting a different power supply, such as switched polarity DC, the surge protectors of the power supply system may operate under suboptimal conditions. For example, the surge protector may experience a suboptimal, extended time from resetting from an activated state to an inactivated state. This extended time may cause damage to other hardware of the power supply system. For example, in cases where the surge protector is a crowbar device, the crowbar device may short circuit the power supply system when in an activated state. Prolonged exposure to a short circuit may cause hardware of the power supply system to become damaged.

According to the present disclosure, a power control system may monitor the power generated by a power supply system for an indication that a surge protector is in an activated state. For example, the power control system may monitor the current or power levels generated by the power supply system. The power control system may determine or identify a current or power surge experienced by the power supply system. Based on the current or power surge, the power control system may determine a surge protector activated in response to the current or power surge.

The power control system may also cause the surge protector to reset at a time different than a normal time for the surge protector to reset. For example, the surge protector may be a crowbar device, and may reset when the current levels reach zero. The power control system may cause the power supply system to increase the frequency at which the current level crosses zero, such as by switching the polarity in DC power at a higher frequency. This may reset the surge protector, which may avoid damage to hardware of the power supply system when the surge protector is in the activated state.

Figure 1:
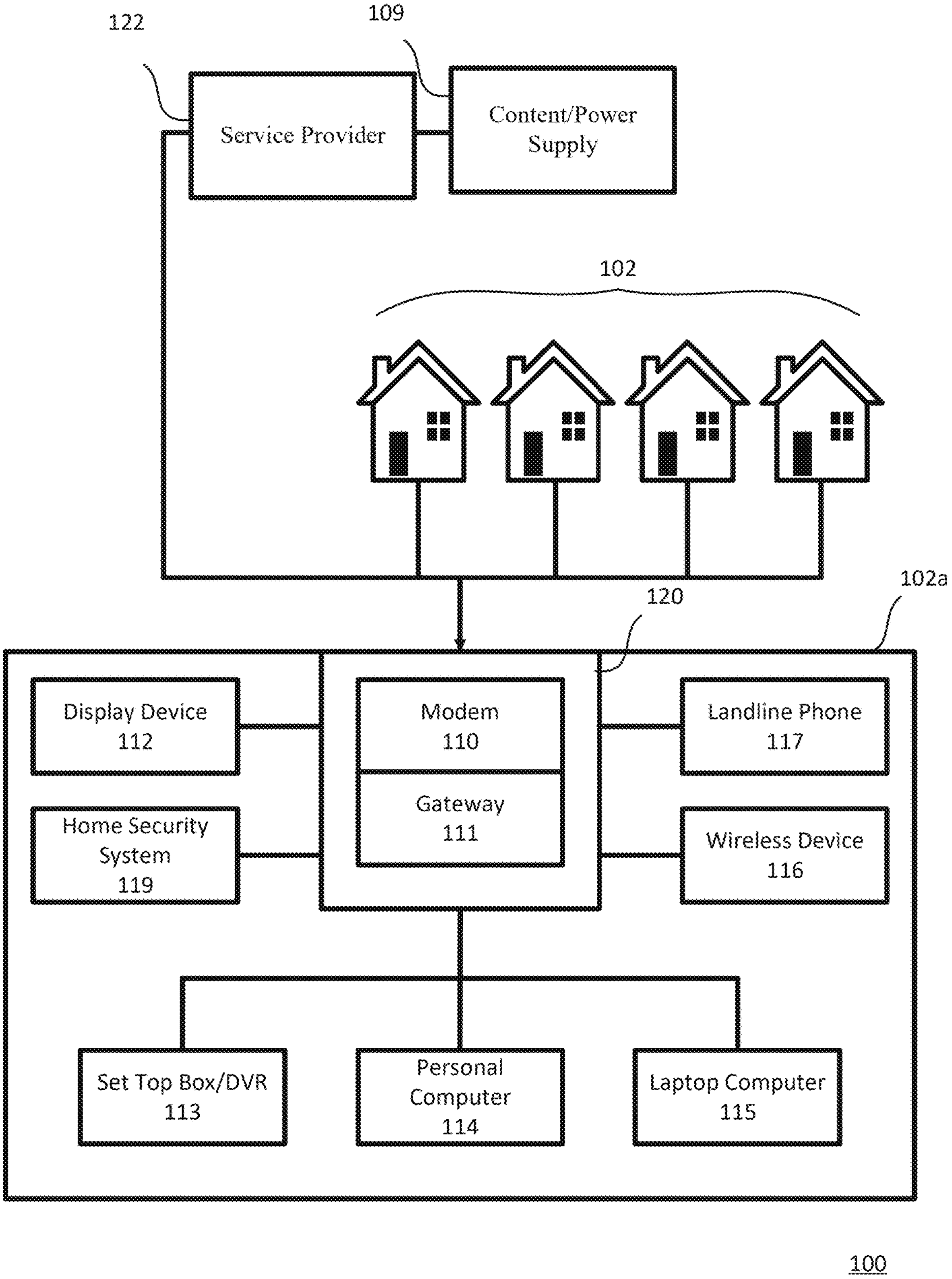
FIG. 1 shows an example system.

FIG. 1 shows an example communication network 100 which may be coupled to a power supply system described herein. Network 100 may be any type of information distribution network, such as satellite, telephone, cellular, wireless, etc. One example may be an optical fiber network, a coaxial cable network, or a hybrid fiber/coax distribution network. Such networks 100 may use a series of interconnected communication links (e.g., coaxial cables, optical fibers, wireless, etc.) to connect multiple premises 102 (e.g., businesses, homes, consumer dwellings, etc.) to a service provider 122 and content/power supply 109. The service provider 122 may provide services related to data, content may transmit downstream information signals via the links, and each premises 102 may have a receiver used to receive and process those signals.

In some cases, the service provider 122 may transmit content via the information signals, such as streaming content or cable television (CATV). In some examples, the streaming content may be Dynamic Adaptive Streaming over HTTP (DASH) content, HTTP Live Streaming (HLS) content, adaptive bit rate (ABR) streaming content, and the like. These information signals may be powered via a power supply, and this the information signals may be composed of both data signals and power signals. The service provider 122 may receive power signals, and data signals, from the content/power supply 109. In some cases, the content/power supply 109 may be separate entities providing different signals to the service provider 122, such as a power supply providing power signals, and a content supply (e.g., a cable headend) providing data signals.

The links may include components not shown, such as splitters, filters, amplifiers, etc. to help convey the signal clearly. Portions of the links may also be implemented with fiber-optic cable, while other portions may be implemented with coaxial cable, other lines, or wireless communication paths.

The service provider 122 may be configured to place data on one or more downstream frequencies to be received by modems at the various premises 102, and to receive upstream communications from those modems on one or more upstream frequencies. The service provider 122 may also include external networks, which may include, for example, networks of Internet devices, telephone networks, cellular telephone networks, fiber optic networks, local wireless networks (e.g., WiMAX), satellite networks, and any other desired network.

An example premises 102*a*, such as a home, may include an interface 120 for creating a personal network at the premises 102*a*. The interface 120 may include any communication circuitry needed to allow a device to communicate on one or more links with other devices in the network. For example, the interface 120 may include a modem 110, which may include transmitters and receivers used to communicate on the links and with the content/power supply 109 The modem 110 may be, for example, a coaxial cable modem (for coaxial cable lines), a fiber interface node (for fiber optic lines), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102*a*, to communicate with the content and power supply 109. The gateway 111 may be a set-top box (STB), digital video recorder (DVR), computer server, or any other desired computing device. The gateway 111 may also include (not shown) local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), landline phones 117 (e.g. Voice over Internet Protocol VoIP phones), IoT devices such as security system devices 119, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
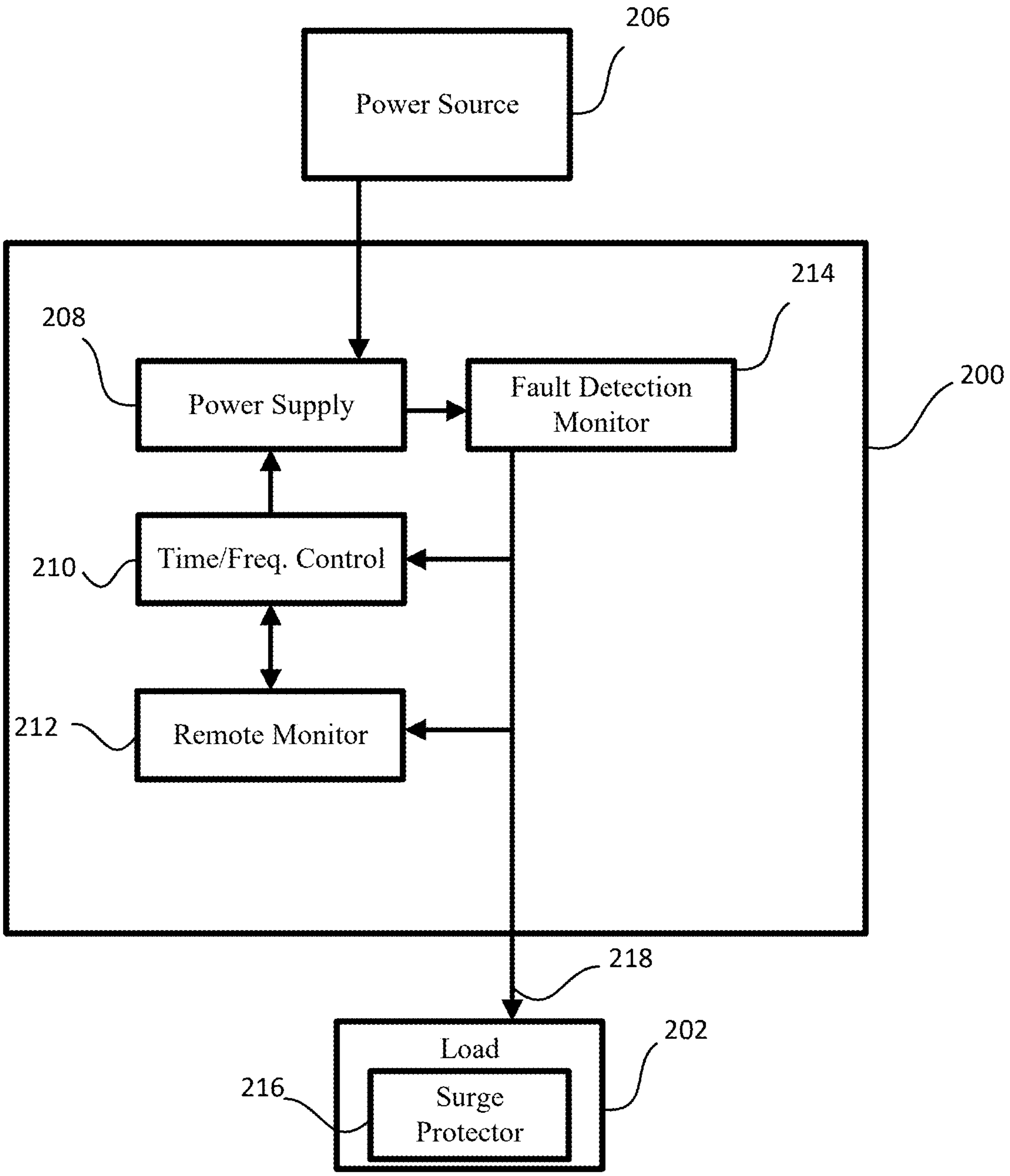
FIG. 2 shows an example system.

FIG. 2 shows a power control system 200 described herein. Power control system 200 may be a part of the service provider 122 as shown in FIG. 1.

The power control system 200 may be configured to transmit power signals to a load 202. The load may also be a part of the service provider 122, and may receive power signals, along with signal data from a content source, to be sent further downstream to destination entities (e.g., premises 102, or a destination device such as the devices shown in the premises 102).

The power control system 200 may be connected to a power source 206. The power source 206 may be part of content/power supply 109 as shown in FIG. 1. The power source 206 may transmit an initial power signal to the power control system 200. The initial power signal may include a utility power signal, a power signal generated by alternate sources such as a solar panel system or a generator, a power signal generated based on energy stored in a battery system, and the like. The initial power signal may be an AC power, such as a 120 or 240 volts AC at 60 Hz. In some cases, the initial power signal may be a DC power signal, or any suitable power signal.

Figure 5A:
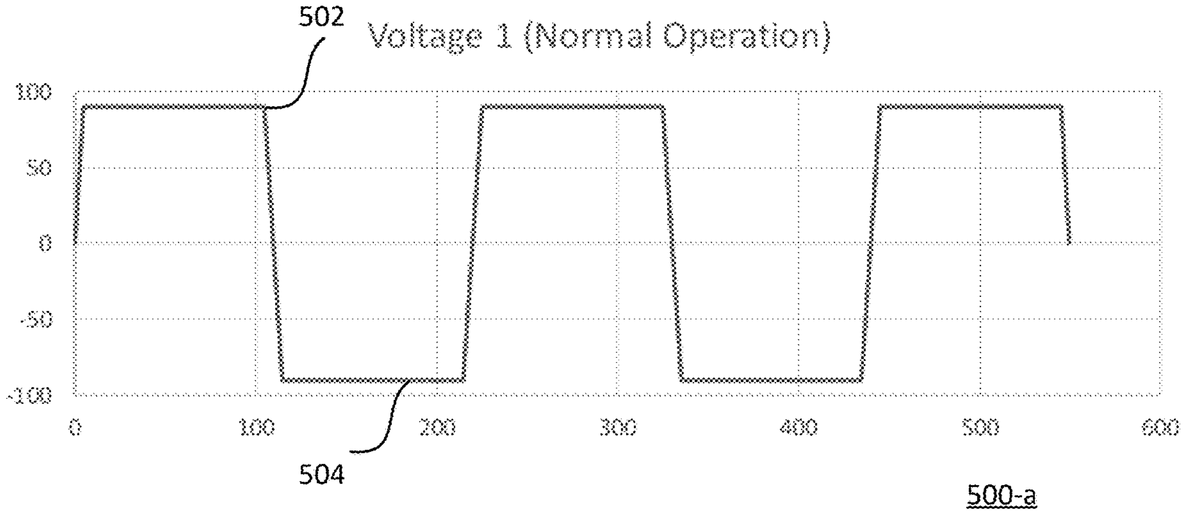
FIGS. 5A and 5B shows example voltage graphs.

The initial power signal may be received by a power supply 208. The power supply 208 may convert the initial power signal to, or may generate, a modified power signal. The modified power signal may be configured to power the load 202, which may be a part of the service provider 122 shown in FIG. 1. For example, the modified power signal may be a switched-polarity DC power signal. For example, a switched-polarity DC power signal may include a first DC voltage level over a certain time period, and a second DC voltage level over a second time period. In some cases, the first DC voltage level may be a positive voltage level having a particular amplitude, and the second DC voltage may be a negative voltage level have the same or different amplitude. FIG. 5A shows an example voltage graph 500-*a* showing a switched polarity DC power signal having a first voltage level 502 and a second voltage level 504, which may be an example of the modified power signal generated by the power supply 208.

In some cases, the modified power signal may include a periodic waveform where the amplitude alternates at a steady frequency between fixed minimum and maximum values. In some cases, the periodic waveform may be non-sinusoidal. In some cases, the waveform may include a pulse wave or a square wave.

The load 202 may receive the modified power signals (signals 218) from the power control system 200. The load 202 may include any device capable of transmitting and receiving data, such as a radio access node, an optical node, and/or a physical layer (PHY) device. Data may be transmissible between the load 202 and data destination(s) through any suitable wireless, wired, and/or fiber optic data transmission system. The load 202 may receive the modified power signals from the power control system 200, where the modified power signals may be utilized by the load 202 to carry or transmit the data signals to the data destination(s). Where the service provider 122 provides content streaming or CATV content (e.g., as a CATV or streaming outside plant (OSP), the data signals may be streaming content, CATV content, and the like.

The load 202 may also include one or more surge protectors 216. The surge protector 216 may be configured to operate in an inactivated state while the modified power signal is in a predefined threshold, such as a predefined power threshold, a predefined current threshold, a predefined voltage threshold, and the like. During the inactivated state, the surge protector 216 may allow the modified power signal to continue to pass through the circuitry or hardware of the load 202. For example, the surge protector 216, when in the inactivated state, may not affect the modified power signals generated by the power control system 200. When in the activated state, the surge protector 216 may disrupt the modified power signals from continuing to pass (e.g., downstream) through the circuitry or hardware of the load 202. For example, the surge protector 216, when in the active state, may create a short circuit in the electrical circuit carrying the modified power signal downstream. The surge protector 216 may be configured to be in the inactivated state across a predefined range, such as a predefined power range, a predefined current range, a predefined voltage range, and the like. The surge protector 216 may be configured to be in the activated state when the modified power signals exceed, or fall outside of, the predefined range, or alternatively when a predefined threshold is met or exceeded. For example, the surge protector 216 may be configured to be in an inactivated state when a voltage of the modified power signal is within the range of −100 V to +100 V.

The surge protector 216 in some cases may be a crowbar device. The crowbar device may, when in an activated state, may cause a short circuit in the circuit carrying the modified power signals. In some cases, the crowbar device may be a thyristor, a trisil, a thyratron, a TRIAC, and the like. In some cases, more than one surge protector 216 may be implemented along the circuit line carrying the modified power signals. In some cases, the surge protector 216 may positioned in different locations with respect the other components of the load, which will be discussed in more detail with respect to FIG. 3.

In some cases, the surge protector 216 may be reset to transition from the activated state to the inactivated state. For example, the surge protector 216 may be configured to reset when a reset value is met or exceeded. For example, the surge protector 216 may reset when the voltage of the modified power signals becomes 0 V. As another example, the surge protector 216 may reset when the current of the modified power signals becomes 0 A. However, the surge protector 216 may be configured to reset across a range of voltage values, current values, power values, and the like.

The surge protector 216 may protect hardware downstream of the surge protector 216 from surge events, such as a spike in current levels, a spike in voltage levels, a spike in power levels, and the like. For example, a current spike that meets or exceeds the predefined current threshold, voltage threshold, etc., of the surge protector 216 may cause the surge protector to transition from the inactivated state to the activated state, which may disrupt or block the surge in the modified power signals from traveling downstream of the surge protector 216. This may prevent the downstream hardware from experiencing this surge event, which may mitigate damage to the downstream hardware caused by the surge event. However, the activated state of the surge protector 216 may also cause issues for the content and power supply system 200. For example, in the case the where the activated state is a short circuit, the short circuit may cause components of the load, or of the power control system 200, to overheat.

The power control system 200 may also include a time and frequency controller 210. The time and frequency controller 210 may be configured to control, adjust, modify, and the like, the characteristics or parameters of the modified power signal. For example, the time and frequency controller 210 may be in communication with the power supply 208, and may provide instructions on adjusting the parameters of the modified power signal. The time and frequency controller 210 may adjust the frequency of the modified power signal. In some cases, the time and frequency controller 210 may adjust the duty cycle of the modified power signal. In some cases, the time and frequency controller 210 may adjust the amplitude of the modified power signal. In some cases, the adjustment may be made when the power supply 208 is generating the modified power signal. For example, the time and frequency controller 210 may instruct the power supply 208 to modify the initial power signal such that the modified power signal has a certain set of characteristics (e.g., a particular duty cycle, a particular frequency, and the like).

The power system 204 of the content and power supply system 200 may also include a remote monitor 212. The remote monitor 212 may transmit and receive communications external to the power system 204, such as with other entities or components within the content and power supply system 200, or external to the content and power supply system 200. For example, the remote monitor 204 may communicate over a network, such as a wireless network, and may communicate to a user device, a computing device, and the like. In some cases, the remote monitor 204 may communicate over a network, such as a wireless network, a DOCSIS network, or a PON network to a device. The remote monitor 204 may be in communication with the time and frequency controller 210, and may receive data indicative or associated with the initial power supply, the modified power supply, and the like. For example, the remote monitor 204 may receive frequency duty cycle, amplitude, and the like, from the power supply 208 for the initial power supply or the modified power supply. Likewise, the remote monitor 212 may communicate these parameters or characteristics to other entities or components (e.g., via an external network).

The remote monitor 212 may also receive communications from other entities or components external to the power control system 200. For example, the remote monitor 212 may receive communications corresponding to instructions for the power control system 200 to implement. For example, the remote monitor 212 may receive communications (e.g., from a user device or computing device) that correspond to instructions for adjusting power settings for the modified power supply. For example, the instructions may include changes to parameters or characteristics of the modified power supply, such as frequency, duty cycle, amplitude, and the like. The remote monitor 212 may transmit communications to the power supply 208 indicative of these instructions, where the power supply may implement changes to the modified power based on the instructions.

The power control system 200 may also include a fault detection monitor 214. The fault detection monitor 214 may monitor the modified power signal. The fault detection monitor 214 may monitor the modified power signal for surge events. A surge event may be a current surge event, a power surge event, a voltage surge event, and the like. The fault detection monitor 214 may detect a surge event based on the characteristics or parameters of the modified power signals. For example, the fault detection monitor 214 may detect a surge based on the modified power signal meeting or exceeding a predefined threshold, such as a current threshold, a power threshold, a voltage threshold, and the like. In some cases, the threshold may be of an absolute value of the characteristic or parameter of the modified power signal. In some examples, the surge event may be detected by the fault detection monitor 214 based on a change in a parameter or characteristic of the modified power signal, such as a rate of change of a current value, a power value, a voltage value, and the like.

The fault detection monitor 214 may determine that a surge protector 216 of the load 202 is in an activated stated based on the determined surge event. For example, in cases where the surge protector 216 is a crowbar device, the fault detection monitor 214 may determine the surge protector 216 is creating a short circuit in the load 202. For example, the determination may be based on the detection of the surge event. In some cases, the determination may be based on operating parameters of the surge protector, such as thresholds for transitioning between the inactivated and activated states (e.g., current, power, voltage thresholds for crossing from inactivated to activated states; current, power, voltage thresholds for resetting from activated to inactivated states, and the like).

Figure 5B:
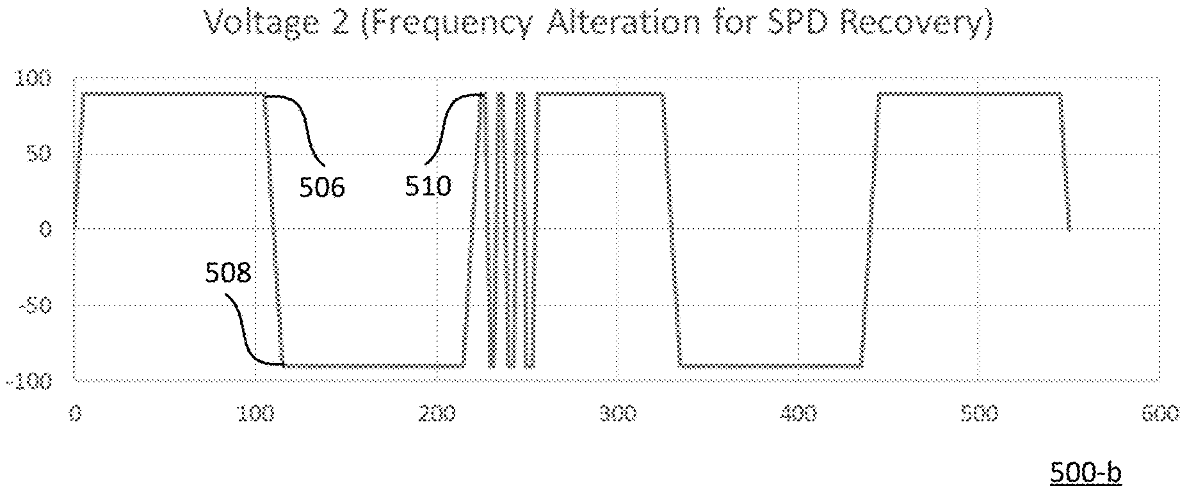

The fault detection monitor 214 may cause the surge protector 216 to reset back to the inactivated state. For example, in cases where the surge protector is a crowbar device, the fault detection monitor 214 may cause the modified power signals to be adjusted such that the crowbar device resets. For example, the fault detection monitor 214 may communicate with time and frequency controller 210, which may cause the power supply to alter or modify the characteristics or parameters of the modified power signals. For example, the time and frequency controller 210 may cause the modified power signals to change in polarity at a higher frequency than during normal operation (e.g., in cases where the modified power signals are switched polarity DC power signals). This example is shown in FIG. 5B, the voltage graph 500-*b* shows what may be considered a normal operation of a switched polarity DC power signal, where the power signal has a first voltage level 506 and a second voltage level 508. The power signal switches polarity to transition from the first voltage level 506 to the second voltage level 508, or vice versa, according to an operating frequency or duty cycle. In cases where the fault detection monitor 214 detects a surge event, the fault detection monitor 214 may initiate an alteration in the modified power signals (e.g., via the time and frequency controller 210). For example, the time and frequency controller 210 may increase the frequency of the polarity switching occurring to the modified power signal, or shorten the duty cycle of the modified power signal. Turning back to FIG. 5B the voltage graph 500-*b* shows an increase in the frequency of the polarity switching of the power signal in region 510, which may be caused by the fault detection monitor 214 detecting a surge event. As crowbar devices may be reset by the power signal crossing or reaching zero, shortening the time for the power signal to cross zero may reset the surge protector 216 more quickly than under normal operation. In some other cases, the time and frequency controller 210 may cause the modified power signals to terminate for a short period of time (e.g., no power), which may also cause the surge protector 216 to reset.

In cases where the surge protector 216 may be reset, or transitioned from the activated state to the inactivated state, based on a characteristic or parameter of the modified power signal, the fault detection monitor 214 may facilitate the resetting of the surge protector 216 in a more efficient manner compared to normal operating parameters of the modified power signal. Further, this alteration may occur for a predefined time period, or for a predefined number of zero-crossings, such that when the time or number of crossings has elapsed, the modified power signal returns to normal operation.

Figure 3:
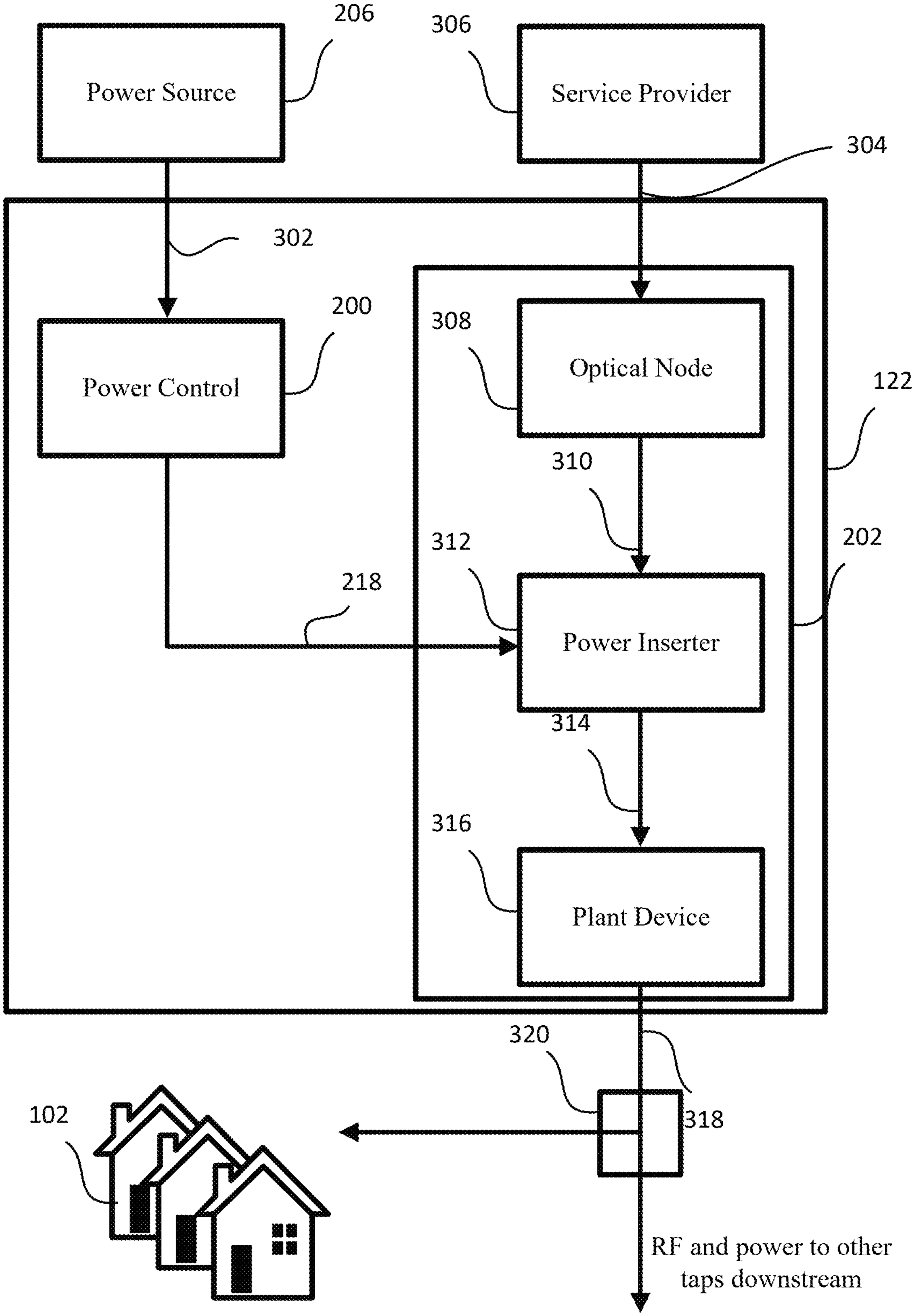
FIG. 3 shows an example system.

FIG. 3 shows a system according to the present disclosure. The system may include a power source, which may be the power source 206 of FIG. 2. The power source may send initial power signals to the service provider, which may be the service provider 122 of FIG. 1. The power control 200 may modify the initial power signals 302 and may generate and send modified power signals 218 to the load, which may be the load 202 of FIG. 2.

The load 202 may also receive data signals 304 from a content source, such as a service provider 306. The service provider 306 may send the data signals as, for example, optical signals (e.g., via optical fibers) to the load 202. The data signals 304 may carry for example, the content to be send to the destination device(s). The data signals 304 may be received by an optical node 308 of the load 202, which may convert the data signals to RF data signals (e.g., from optical signals).

The optical node 308 may send the RF signals 310 to a power inserter 312. The power inserter 312 may receive the RF data signals 310 and the modified power signals 218. The power inserter 312 may combine the RF data signals 310 and the modified power signals 218 to form a combined signal 314. The combined signal 314 may be sent from the power inserter 312 to a plant device 316. The plant device 316 may be a signal amplifier, a signal filter, and the like, which may further condition the combined signal 314. The conditioned signal 318 may be sent downstream to various RF taps 320, which may filter the RF signal from the conditioned signal 320, and may send the filtered RF signal carrying the data (e.g., content) to destination device(s), which may be premise 102 of FIG. 1.

Certain components downstream of power control system 200 may include a surge protector, such as surge protector 216 of FIG. 2. For example, the plant device 316 of the load 202 may include a surge protector. The power inserter 312 of the load may include a surge protector. Other optical or RF nodes of the load 202 may include a surge protector. Likewise, RF taps 320 may include a surge protector. The processes and systems described herein may facilitate effective use of these surge protectors, while also minimizing the risks involved with having the surge protectors being in an active state for a long period of time.

Figure 4:
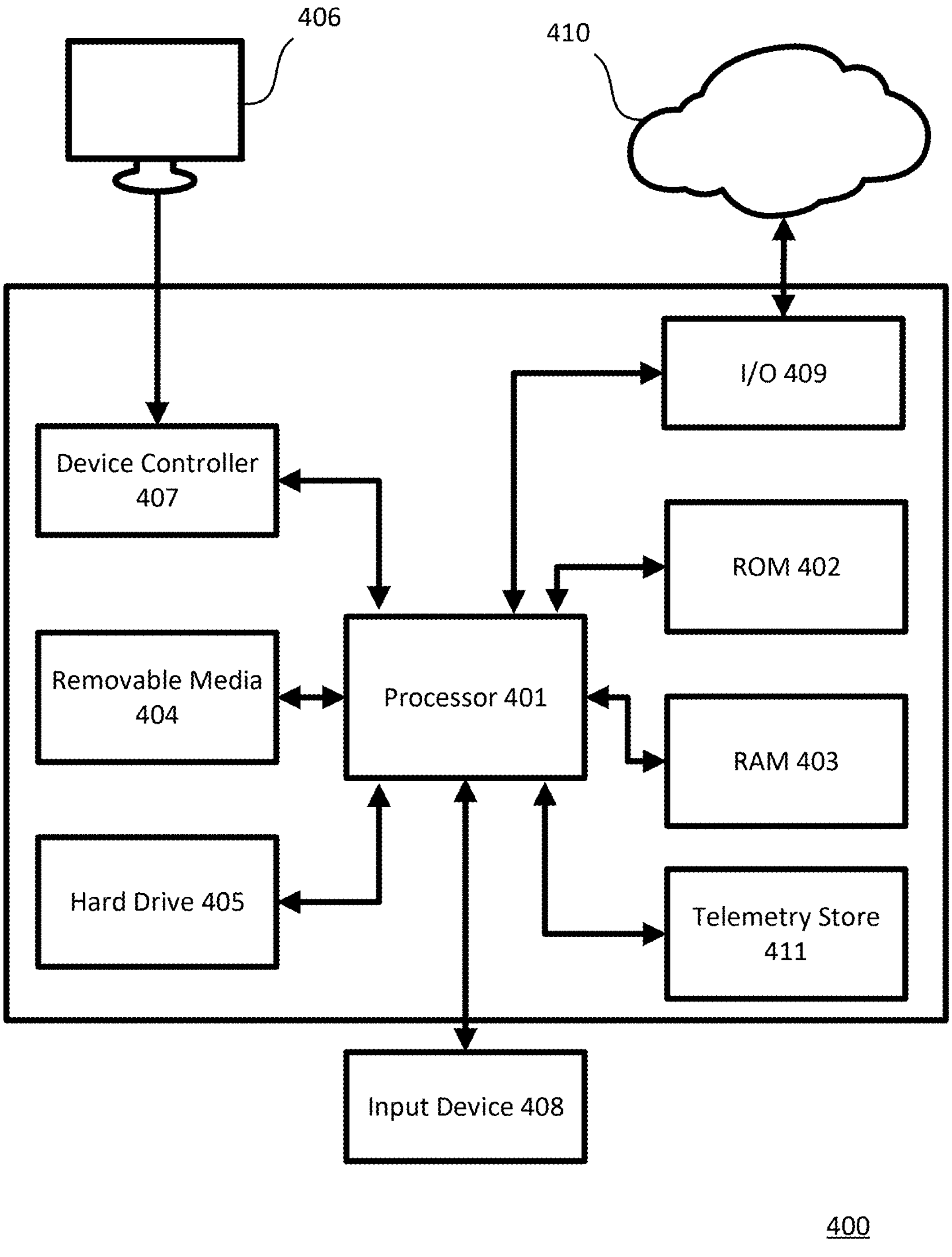
FIG. 4 shows an example computing device.

FIG. 4 depicts a computing device 400 that may be used in various aspects, such as the devices depicted in FIGS. 1-3. The computer architecture shown in FIG. 1 shows a content and power supply, a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 6 and 7. Likewise, FIG. 2 shows a power source, a power supply, a time and frequency controller, a remote monitor, a fault detection monitor, a surge protector, and load, which may be utilized to execute any aspects of the methods described herein. For example, some or all of the components of FIG. 2 can be a part of a computing device, or each component may be a computing device. FIG. 3 shows power and content supplies and cable plants, which may be utilized to execute any aspects of the methods described herein. For example, some or all of the components of FIG. 3 can be a part of a computing device, or each component may be a computing device.

The computing device 400 may include a baseboard, or "motherboard," which is a printed circuit board to which a multitude of components or devices may be connected by way of a system bus or other electrical communication paths. One or more central processing units (CPUs) 401 may operate in conjunction with a chipset 406. The CPU(s) 401 may be standard programmable processors that perform arithmetic and logical operations necessary for the operation of the computing device 400.

The CPU(s) 401 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 401 may be augmented with or replaced by other processing units, such as GPU(s) 405. The GPU(s) 405 may comprise processing units specialized for but not necessarily limited to highly parallel computations, such as graphics and other visualization-related processing.

A chipset 406 may provide an interface between the CPU(s) 401 and the remainder of the components and devices on the baseboard. The chipset 406 may provide an interface to a random access memory (RAM) 408 used as the main memory in the computing device 300. The chipset 406 may further provide an interface to a computer-readable storage medium, such as a read-only memory (ROM) 420 or non-volatile RAM (NVRAM) (not shown), for storing basic routines that may help to start up the computing device 400 and to transfer information between the various components and devices. ROM 420 or NVRAM may also store other software components necessary for the operation of the computing device 400 in accordance with the aspects described herein.

The computing device 400 may operate in a networked environment using logical connections to remote computing nodes and computer systems through local area network (LAN) 416. The chipset 406 may include functionality for providing network connectivity through a network interface controller (NIC) 422, such as a gigabit Ethernet adapter. A NIC 422 may be capable of connecting the computing device 400 to other computing nodes over a network 416. It should be appreciated that multiple NICs 422 may be present in the computing device 400, connecting the computing device to other types of networks and remote computer systems.

The computing device 400 may be connected to a mass storage device 428 that provides non-volatile storage for the computer. The mass storage device 428 may store system programs, application programs, other program modules, and data, which have been described in greater detail herein. The mass storage device 428 may be connected to the computing device 400 through a storage controller 424 connected to the chipset 406. The mass storage device 428 may consist of one or more physical storage units. A storage controller 424 may interface with the physical storage units through a serial attached SCSI (SAS) interface, a SATA interface, a fiber channel (FC) interface, or other type of interface for physically connecting and transferring data between computers and physical storage units.

The computing device 400 may store data on a mass storage device 428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 428 is characterized as primary or secondary storage and the like.

For example, the computing device 400 may store information to the mass storage device 428 by issuing instructions through a storage controller 424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 may further read information from the mass storage device 428 by detecting the physical states or characteristics of one or more particular locations within the physical storage units.

In addition to the mass storage device 428 described herein, the computing device 400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 428 depicted in FIG. 4, may store an operating system utilized to control the operation of the computing device 400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 428 may store other system or application programs and data utilized by the computing device 400.

The mass storage device 428 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 400 by specifying how the CPU(s) 404 transition between states, as described herein. The computing device 400 may have access to computer-readable storage media storing computer-executable instructions, which, when executed by the computing device 400, may perform the methods described in relation to FIGS. 5 and 7.

A computing device, such as the computing device 400 depicted in FIG. 4, may also include an input/output controller 432 for receiving and processing input from a number of input devices, such as a keyboard, a mouse, a touchpad, a touch screen, an electronic stylus, or other type of input device (e.g., a remote control via infrared, Bluetooth, and the like). Similarly, an input/output controller 432 may provide output to a display, such as a computer monitor, a flat-panel display, a digital projector, a printer, a plotter, or other type of output device. It will be appreciated that the computing device 400 may not include all of the components shown in FIG. 4, may include other components that are not explicitly shown in FIG. 4, or may utilize an architecture completely different than that shown in FIG. 4.

As described herein, a computing device may be a physical computing device, such as the computing device 400 of FIG. 4. A computing node may also include a virtual machine host process and one or more virtual machine instances. Computer-executable instructions may be executed by the physical hardware of a computing device indirectly through interpretation and/or execution of instructions stored and executed in the context of a virtual machine.

Figure 6:
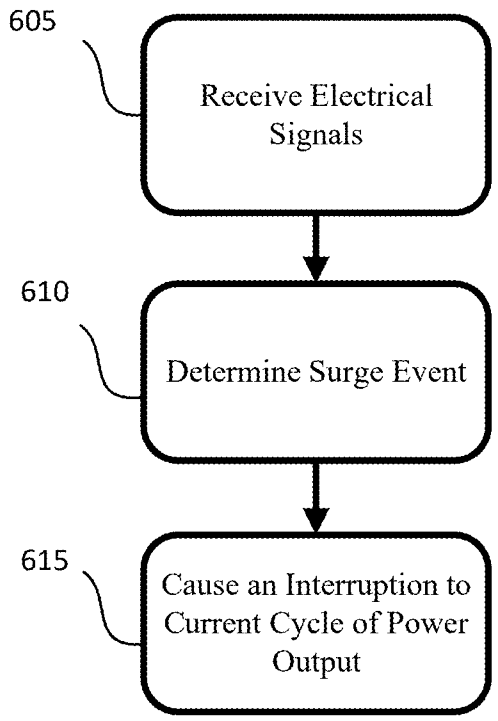
FIG. 6 shows an example method.

FIG. 6 shows an example method. The method may comprise a computer implemented method. The method may be implemented by one or more devices (e.g., computing devices, servers) and/or services disclosed herein, such as the devices, storage, and/or services of FIGS. 1-3. One or more of the steps of the method may be implemented by the fault detection monitor 214, and/or other components of the power control system 200.

At Step 605, electrical signals indicative of the power output of a power source may be received. In some cases, the power output of the power source may be a switched polarity DC power output. In some cases, the power output may have a frequency set at a predefined value (e.g., 1 Hz).

At Step 610, the computing device may determine, based on the received electrical signals, a current surge event experienced by the power source. In some cases, the determination may be based on the electrical signals meeting or exceeding a power threshold or a current threshold. In some cases, the determination may be based on the electrical signals exceeding a rate of change of a current or power level (e.g., over a predefined period of time). In some cases, the computing device may determine that a surge protector is activated based on the current surge event. In some cases, the computing device, the surge protector, or both, may be part of a power supply system, such as the system 200 of FIG. 2.

At Step 615, the computing device may, based on the determined current surge event, cause an interruption to a current cycle of the power output. The interruption may reset the surge protector activated by the current surge event. In some cases, the surge protector may be a crowbar device, such as thyristor device or a gas discharge tube. In some cases, the activated state of the surge protector may cause a short circuit between the power source and a destination entity (e.g., a content consumer or end user). In some cases, the interruption may be an alteration or a modification of the power output. For example, the interruption may be an increase in a frequency of the power output, an increase in a number of polarity changes of the power output, an implementation of a polarity change and increase in transition rate of the power output, a voltage dropout of the power output, and the like. In some cases, the interruption may be for a predefined period of time (e.g., ¼ of a cycle of the power output). In some cases, the interruption may be for a predefined number of zero-crossings of the voltage of the power output. The computing device may then cause the power output to return to its normal operation.

Figure 7:
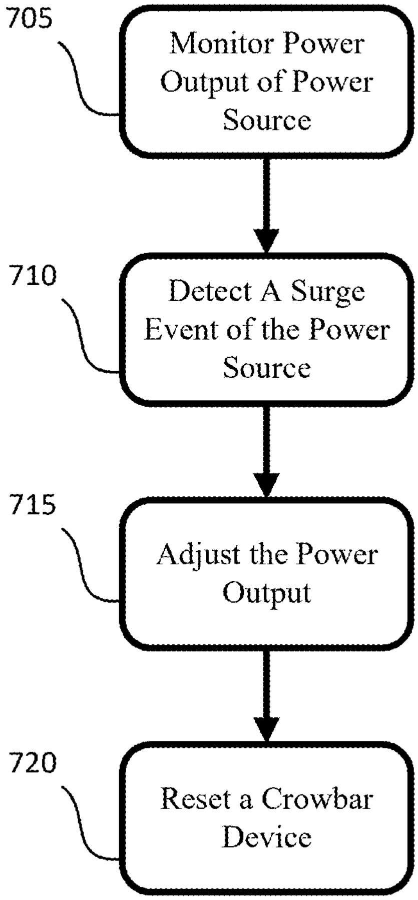
FIG. 7 shows an example method.

FIG. 7 shows an example method. The method may comprise a computer implemented method. The method may be implemented by one or more devices (e.g., computing devices, microcontrollers, servers) and/or services disclosed herein, such as the devices, storage, and/or services of FIGS. 1-3. One or more of the steps of the method may be implemented by the fault detection monitor 214, or other components of the power control system 200 of FIG. 2.

At Step 705, a computing device may monitor a power output of a power source. In some cases, the power output of the power source may be a switched polarity DC power output. In some cases, the power output may have a frequency set at a predefined value (e.g., 1 Hz). In some cases, the power source may be a part of a power control system, such as power control system 200 of FIG. 2. In some cases, the computing device may be a part of the power control system.

At Step 710, the computing device may detect, based on the monitoring, a current surge event experienced by the power source. In some cases, the detection may be based on the power output meeting or exceeding a power threshold or a current threshold. In some cases, the detection may be based on the power output exceeding a rate of change of a current or power level (e.g., over a predefined period of time). In some cases, the computing device may determine that a surge protector is activated based on the current surge event. In some cases, the surge protector may be part of a service provider (e.g., cable plant) which may also include the power control system.

At Step 715, the computing device may, based on the detected current surge event, adjust the power output of the power source. The adjustment may reset the surge protector activated by the current surge event. In some cases, the surge protector may be a crowbar device, such as thyristor device or a gas discharge tube. In some cases, the activated state of the surge protector may cause a short circuit between the power source and a destination entity (e.g., a content consumer or end user). In some cases, the adjustment may be an alteration or a modification of the power output. For example, the adjustment may be an increase in a frequency of the power output, an increase in a number of polarity changes of the power output, an implementation of a polarity change and increase in transition rate of the power output, a voltage dropout of the power output, and the like. In some cases, the adjustment may be for a predefined period of time (e.g., ¼ of a cycle of the power output). In some cases, the interruption may be for a predefined number of zero-crossings of the voltage of the power output. At Step 720, the computing device may reset the crowbar device. The resetting may be caused by the adjusting of the power output. In some cases, the resetting may be at a time quicker than what the power output causes under normal operation (e.g., at a standard operating frequency of the power output).

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:

receiving, by a computing device, electrical signals indicative of a power output of a power source;

determining, by the computing device and based on the received electrical signals, a current or voltage surge event of the power output; and causing, by the computing device and based on the determined current or voltage surge event, an interruption to a current cycle of the power output by switching a polarity of power output, wherein the interruption resets a surge protector activated by the current or voltage surge event, and wherein the interruption comprises an implementation of a plurality of polarity changes over a predefined period of time.

2. The method of claim 1, wherein the power output of the power source comprises a switched polarity direct current (DC) power output.

3. The method of claim 1, wherein the surge protector comprises a crowbar device.

4. The method of claim 1, wherein the surge protector comprises a thyristor device or a gas discharge tube.

5. The method of claim 1, wherein determining the current or voltage surge event comprises identifying the received electrical signals exceed a current or voltage threshold.

6. The method of claim 1, wherein switching of the polarity of the power output comprises switching the polarity at a greater frequency than a normal polarity switching frequency for the power output.

7. The method of claim 6, wherein the interruption further comprises an alteration of a transition rate for the power output.

8. The method of claim 1, wherein the interruption comprises implementing a voltage dropout for a predefined period of time.

9. The method of claim 1, wherein the interruption causes the power output to experience one or more zero crossing events.

10. A method comprising:

monitoring, by a computing device, a power output of a power source;

detecting, by the computing device and based on the monitoring, a current surge event of the power source;

adjusting, by the computing device and based on the detected current surge event, the power output of the power source by increasing a frequency for polarity switching of the power output, thereby causing a plurality of polarity changes over a predefined period of time; and resetting, by the computing device and via the adjusting, a crowbar device activated by the current surge event.

11. The method of claim 10, wherein the power output of the power source comprises a switched polarity direct current (DC) power output.

12. The method of claim 10, wherein the power source comprises an outside plant (OSP), a cable plant, a cable television (CATV) provider, a content streaming provider, or a combination thereof.

13. The method of claim 12, wherein the power output is configured to transmit a CATV or content stream.

14. The method of claim 10, wherein the crowbar device is activated due to the current surge event.

15. The method of claim 10, wherein the increasing the frequency of the polarity switch causes the power output to cross a zero-voltage threshold at a short time compared to a normal operation of the power output.

16. The method of claim 10, wherein a switching frequency for the power output is less than 60 Hz.

17. A system comprising:

a power source configured to transmit a power output; and a computing device in communication with the power source, the computing device configured to:

receive electrical signals indicative of the power output of the power source;

determine, based on the received electrical signals, a current surge event of the power output; and cause, based on the determined current surge event, an interruption to a current cycle of the power output by switching a polarity of power output, wherein the interruption resets a surge protector activated by the current surge event, and wherein the interruption comprises an implementation of a plurality of polarity changes over a predefined period of time.

18. The system of claim 17, wherein the power output of the power source comprises a switched polarity direct current (DC) power output.

19. The system of claim 17, wherein the surge protector comprises a crowbar device.

* * * * *